United States Patent

Ootsuka et al.

[11] Patent Number: 5,195,755
[45] Date of Patent: Mar. 23, 1993

[54] SHAFT SEAL FOR SLURRY PUMPS

[75] Inventors: Junji Ootsuka; Youichi Ogata; Keizaburo Nishi, all of Sakado, Japan

[73] Assignee: Eagle Industry Co., Ltd., Japan

[21] Appl. No.: 841,272

[22] Filed: Feb. 26, 1992

Related U.S. Application Data

[63] Continuation of Ser. No. 633,311, Dec. 24, 1990, abandoned.

[30] Foreign Application Priority Data

Dec. 25, 1989 [JP] Japan .................. 1-148837[U]

[51] Int. Cl.⁵ ............................................. F16J 15/16
[52] U.S. Cl. ........................................ 277/92; 277/82; 277/96.1; 277/237 A
[58] Field of Search ........ 277/92, 82, 237 A, DIG. 4, 277/70, 67, 133, 74, 96.1, 134

[56] References Cited

U.S. PATENT DOCUMENTS

| | | | |
|---|---|---|---|
| 1,999,662 | 4/1935 | Nell | 277/133 |
| 2,036,453 | 4/1936 | Bary | 277/133 |
| 2,961,258 | 11/1960 | Donley et al. | 277/96 |
| 3,656,820 | 4/1972 | Pensa | 277/92 |
| 3,767,214 | 10/1973 | Kawamura | 277/92 |
| 3,861,765 | 1/1975 | Follert et al. | 277/92 |
| 4,256,315 | 3/1981 | Larson | 277/92 |
| 4,270,759 | 6/1981 | Denton et al. | 277/92 |
| 4,884,945 | 12/1989 | Boutin et al. | 277/96.1 |
| 5,129,659 | 7/1992 | Ootsuka et al. | 277/92 |

FOREIGN PATENT DOCUMENTS

| | | | |
|---|---|---|---|
| 3446542 | 10/1986 | Fed. Rep. of Germany | 277/92 |
| 0857605 | 8/1981 | U.S.S.R. | 277/92 |

Primary Examiner—William A. Cuchlinski, Jr.
Assistant Examiner—Daniel G. DePumpo

[57] ABSTRACT

A slurry seal assembly is provided which includes a casing, a flange fixed to the casing, a sleeve and seal cover located over a shaft and seal rings fitted into the sleeve through packings and in which parts of the surfaces of the members confronting a confined space are all protected by a synthetic rubber, thereby improving their resistance to slurry.

1 Claim, 1 Drawing Sheet

SHAFT SEAL FOR SLURRY PUMPS

This application is a continuation of application Ser. No. 07/633,311 filed Dec. 24, 1990 now abandoned.

BACKGROUND OF THE INVENTION

1. Field of the Invention

The present invention relates to an improvement in a slurry seal for sealing a liquid containing a large amount of slurry.

2. Prior Art

A slurry pump heretofore available for pumping up muddy water and other purposes is provided with such a slurry seal as shown in FIG. 2 as its shaft sealing means.

Referring to FIG. 2, that slurry seal is designed in such a way that a stationary seal ring 103 fitted through a packing 102 into a flange 101 located on a pump casing and a rotary seal ring 108 fitted through a packing 107 into a seal cover 106 secured on the outside of an end of a sleeve 105 attached on the outside of a shaft 104 are mutually slid on their sliding planes 103a and 108a while they slide in a close contact with each other, thereby preventing any leakage of a sealing liquid sealed in an outer confined space S leading to an impeller region, not shown, from around the shaft.

The flange 101 is provided with a quenching hole 109 open on a side 113 of the packing 102 located on the outside of the stationary seal ring 103, which is positioned in opposition to the confined space S. Between the inner faces of both seal rings 103 and 108 and the outer face of the sleeve 105 located on the side of the shaft 104, there is provided a baffle sleeve 110 fixed at one end to the inner end of the flange 101 and having the other end extending to an inner-peripheral position of the rear end of the rotary seal ring 108. As a quenching later is supplied through the quenching hole 109 into the side 113 of the packing 102, it flows through a gap 111 located on the outside of the baffle sleeve 110 toward the seal cover 106, whence it is discharged to the atmosphere A through a gap between the baffle sleeve 110 and the sleeve 105.

With such a conventional slurry seal as described above, however, it is known that a slurry of earth and sand or coal powders contained in large quantities in the liquid contained in the confined space S causes a premature wearing-away of the surfaces of the flange 101, both seal rings 103, 108, sleeve 105 and seal cover 106 to contact the confined space S, decreasing service life.

When the flange 101, both seal rings 103, 108, sleeve 105 and seal cover 106 are formed of a high-hardness material With a view to improving their resistance to slurry, there arises a problem that the assembly is hard to manufacture for the very reason of hardness.

In view of the foregoing, an object of this invention is to prevent a premature wearing-away of the surface of a slurry seal assembly to contact a confined space.

SUMMARY OF THE INVENTION

According to this invention, the above mentioned object is achieved by the provision of a slurry seal including a stationary seal ring fitted into a flange fixed to a casing through a packing, which serves as spring means as well, and a rotary seal ring fitted into a seal cover fixed to a sleeve of a shaft through a packing, which serves as spring means, said seal rings being adapted to be slid on their axially opposite sliding faces while they are in a close contact with each other, wherein parts of the surfaces of said flange, sleeve, seal cover and seal rings, which face a confined space, are all covered with a synthetic rubber.

According to the above-mentioned arrangement, the parts of the surfaces of the flange, sleeve, seal cover and seal rings, which face a confined space, are all protected against a slurry by the synthetic rubber which is one of the materials having an ever more improved wear resistance. Thus, the flange, sleeve, seal cover and seal rings are greatly improved in their resistance to slurry.

BRIEF DESCRIPTION OF THE DRAWINGS

The present invention will now become apparent from a reading of the following detailed description with reference to the accompanying drawings, in which.

DETAILED EXPLANATION OF THE INVENTION

Figure 1:
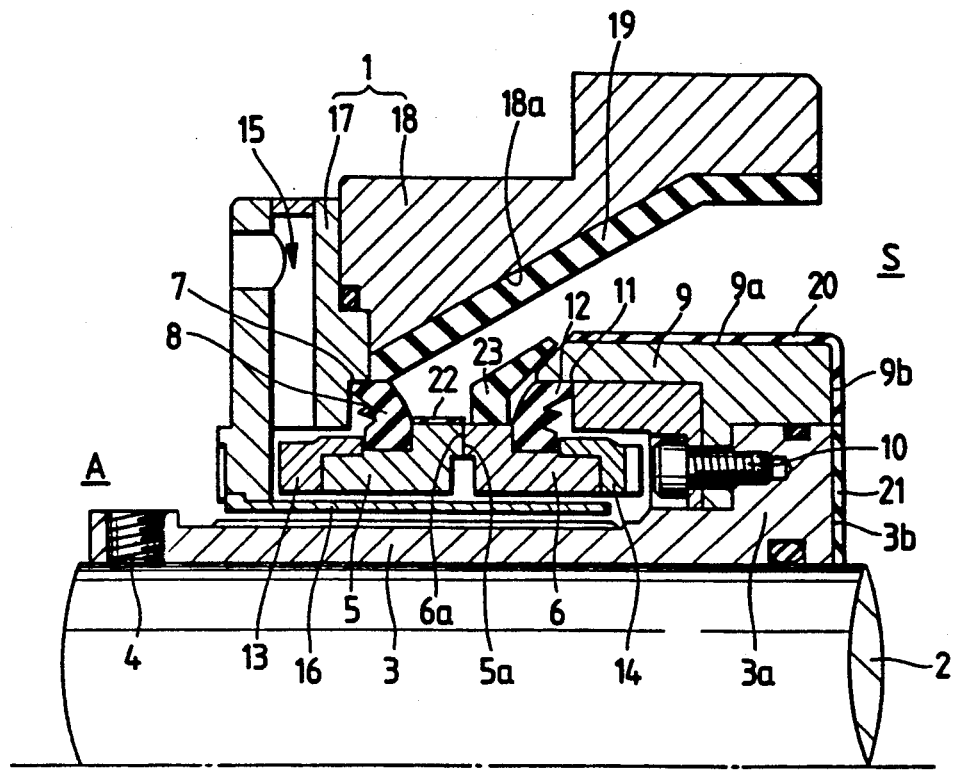
FIG. 1 is a partly cut-away sectional view of one embodiment of the slurry seal according to this invention.
Figure 2:
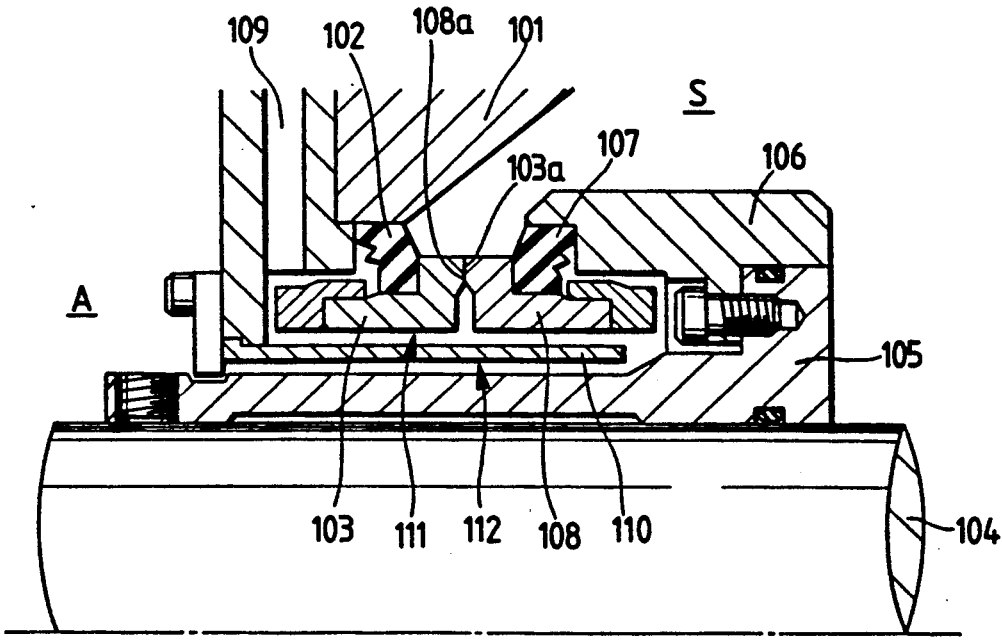
FIG. 2 is a partly cut-away sectional view of a conventional structure.

Referring FIG. 1, a flange 1 is fixed to the inner periphery of a pump casing, not shown. A shaft 2 is inserted through the flange 1 to rotate an impeller to be mounted at the right-handed end of the drawing, although not illustrated. A sleeve 3 is airtightly fitted over the shaft 2 and fixed in place by means of a set screw 4.

A slurry seal assembly is provided between the flange 1 and the shaft to prevent a slurry-containing liquid sealed in a confined space S on the inside of the pump casing from flowing from that space along and around the shaft to the atmosphere A. As illustrated, this assembly includes a stationary seal ring 5 formed of silicon carbide (SiC) having an increased wear resistance and a rotary seal ring 6 again formed of silicon carbide, which is brought in axially sliding contact with the seal ring 5 to define sliding planes 5a and 6a.

On the inner periphery of the flange 1 facing the confined space S, there is provided an annular engaging step 7. The stationary seal ring 5 is engaged with the inner periphery of the step 7 through a packing 8 made of an elastomer, so that it is resilliently supported from outside. A seal cover 9 is airtightly mounted over a collar end 3a of the sleeve 3 fitted over the shaft 2, which is located within, and is bolted at 10 in place. At an end of the seal cover 3 in axial opposition to the flange 1, there is provided an annular engaging step 11 corresponding to the first-mentioned step 7. The rotary seal ring 6 is engaged with the inner periphery of the second step 11 through a packing 12 similar to the packing 8, so that it is resilliently supported from the outside.

The rear ends of both seal rings 5 and 6 (opposite to the sliding planes 5a and 6a) are engaged with metallic retainers 13 and 14, respectively. The retainers 13 and 14 are in turn peripherally engaged with pins (not shown) extending axially from the insides of the flange 1 and seal cover 9, thereby keeping the stationary seal ring 5 fixed while transmitting a rotational force from the shaft 2 to the rotary seal ring 6 to turn it.

The packings 8 and 12 are provided to maintain the airtightness between the flange 1 and the stationary seal ring 5 and the airtightness between the seal cover 9 and the rotary seal ring 6 and, at the same time, serve as a spring means for forcing the seal rings 5 and 6 toward each other with their resilliency to give the required pressure to sliding planes 5a and 6a for their sealing.

A quenching hole 15 is formed through the flange 1, and a baffle sleeve 16 is provided to form a quenching water passage extending from the quenching hole 15 within both the seal rings 5 and 6.

The flange 1 comprises an outer flange member 17 through which the quenching hole 15 extends and an inner flange member 18 located on its inside. An inner tapered face 18a of the inner flange member 18 directing to the confined space S is lined with a synthetic rubber 19. A synthetic rubber 20 is covered on an outer face 9a and a rear end face 9b of the seal cover 9, both faces directing to the confined space S. A synthetic rubber 21 is covered on a rear end face 3b of the collar end 3a of the sleeve 3, which is located adjacent to the above-mentioned rear end 9b, and a synthetic rubber 22 is covered on a part of the outer face of the stationary seal ring 5, which extends from the packing 8 into the confined space S. A dust trap 23 is bonded at its fixed end to a part of the outer face of the rotary seal ring, which extends from the packing 12 into the confined space S, and has its free end allowed to be close to the front face of the seal cover 9 with a minute gap, covering the packing 12 from the confined space S.

According to the instant embodiment, the metallic surfaces of the inner flange member 18 of the flange 1, the seal cover 9, the collar end 3a of the sleeve 3 and the stationary seal ring 5, which confront the confined space, are all covered with the synthetic rubber materials 19, 20, 21 and 22 having an improved wear resistance, so that they are unlikely to be worn away by the slurry contained in the liquid sealed.

According to the slurry seal of this invention, the metallic surface of the parts of the flange, sleeve, seal cover and seal ring, which face the confined space, are all so protected by a synthetic rubber that they can be prevented from being worn away by a slurry sealed in the confined space, improving the resistance of the slurry seal to slurry.

What is claimed is:

1. A mechanical seal apparatus for a slurry pump comprising:
   a rotatable shaft;
   a non-rotating sealing ring disposed about said shaft;
   a non-rotating annular flange disposed about said shaft and said non-rotating sealing ring;
   a first annular elastic packing member positioned in sealing relationship between said non-rotating flange and said sealing ring;
   a rotatable sealing ring axially spaced from said non-rotating sealing ring along the axis of said rotatable shaft and disposed about said shaft;
   an annular sleeve in sealing relationship with said shaft;
   a seal cover fixed to and extending laterally from said annular sleeve;
   a second annular elastic packing member positioned in sealing relationship between said seal cover and said rotatable sealing ring;
   an annular skirt member attached to one end to said rotatable sealing ring, with said annular skirt member being spaced from but coextensive with said annular elastic packing member, and the outer extend of said annular skirt terminating adjacent to and spaced from said seal cover;
   said non-rotating and rotatable sealing rings having opposed sealing surfaces generally perpendicular to the axis of said shaft and in contact with each other to form a seal therebetween;
   wherein portions of said non-rotating flange, annular sleeve, rotatable and non-rotating seal rings, and seal cover which are exposed to fluid slurry being pumped being covered by a coating of synthetic rubber.

* * * * *